US009886769B1

(12) United States Patent
Tremaine et al.

(10) Patent No.: US 9,886,769 B1
(45) Date of Patent: Feb. 6, 2018

(54) USE OF 3D DEPTH MAP WITH LOW AND HIGH RESOLUTION 2D IMAGES FOR GESTURE RECOGNITION AND OBJECT TRACKING SYSTEMS (71) Applicants: Jamie Douglas Tremaine, Parry Sound (CA); Oliver Pilgrim Hinds, Somerville, MA (US); Brian Frederick Rossa, Englewood, FL (US)

(72) Inventors: Jamie Douglas Tremaine, Parry Sound (CA); Oliver Pilgrim Hinds, Somerville, MA (US); Brian Frederick Rossa, Englewood, FL (US)

( * ) Notice: Subject to any disclaimer, the term of this patent is extended or adjusted under 35 U.S.C. 154(b) by 0 days.

(21) Appl. No.: 14/963,992

(22) Filed: Dec. 9, 2015

Related U.S. Application Data (60) Provisional application No. 62/089,697, filed on Dec. 9, 2014.

(51) Int. Cl.
*G06K 9/34* (2006.01)
*G06T 7/207* (2017.01)
*G06T 7/40* (2017.01)
*G06T 7/564* (2017.01)
*G06T 7/60* (2017.01)
*G06K 9/00* (2006.01)

(52) U.S. Cl.
CPC ............ *G06T 7/207* (2017.01); *G06K 9/0063* (2013.01); *G06T 7/40* (2013.01); *G06T 7/564* (2017.01); *G06T 7/60* (2013.01)

(58) Field of Classification Search
None
See application file for complete search history.

(56) References Cited

U.S. PATENT DOCUMENTS

| | | | | |
|---|---|---|---|---|
| 7,889,949 B2 * | 2/2011 | Cohen | .................. | G06T 3/4007 382/299 |
| 7,961,945 B2 * | 6/2011 | Schiwietz | ............. | G06T 3/0012 382/128 |

(Continued)

OTHER PUBLICATIONS

Combining RGB and ToF Cameras for Real-time 3D Hand Gesture Interaction, Michael Van den Bergh et al., IEEE, 978-1-4244-9497-2, 2010, pp. 66-72.*

*Primary Examiner* — Jayesh A Patel
(74) *Attorney, Agent, or Firm* — Woods Oviatt Gilman LLP; Dennis B. Danella, Esq.

(57) ABSTRACT

Disclosed herein according to one embodiment is an object tracker for tracking an object. The object tracker includes a depth camera for acquiring a 3D depth map and a low-resolution 2D image of the object, and an image camera for acquiring a high-resolution 2D image of the object. A processor is in communication with the depth camera and the image camera. The processor is configured to: identify a region of interest within the 3D depth map; identify an approximate object silhouette within the low-resolution 2D image using information about the region of interest from the 3D depth map; identify the approximate object silhouette in the high-resolution 2D image using information about the approximate object silhouette from the low-resolution 2D image; generate a refined object silhouette within the high-resolution 2D image using a region segmentation process; and track the object using the refined object silhouette.

20 Claims, 9 Drawing Sheets

(56) References Cited

U.S. PATENT DOCUMENTS

| | | | |
|---|---|---|---|
| 8,121,407 B1* | 2/2012 | K | G06T 7/187 382/173 |
| 8,134,637 B2* | 3/2012 | Rossbach | G01S 17/89 348/336 |
| 8,891,905 B2* | 11/2014 | Cui | G06T 3/4053 382/299 |
| 9,547,907 B2* | 1/2017 | Somanath | G06T 7/11 |
| 2006/0291721 A1* | 12/2006 | Torr | G06K 9/342 382/173 |
| 2007/0165949 A1* | 7/2007 | Sinop | G06K 9/342 382/173 |
| 2007/0216894 A1* | 9/2007 | Garcia | G01B 11/2545 356/4.01 |
| 2009/0033737 A1* | 2/2009 | Goose | G06F 3/0481 348/14.07 |
| 2010/0302376 A1* | 12/2010 | Boulanger | G06T 7/136 348/164 |
| 2010/0322477 A1* | 12/2010 | Schmitt | G01S 17/00 382/103 |
| 2011/0110585 A1* | 5/2011 | Kang | G06K 9/00369 382/164 |
| 2011/0164152 A1* | 7/2011 | Hong | G03B 13/18 348/239 |
| 2011/0187703 A1* | 8/2011 | Patwardhan | G06K 9/00 345/419 |
| 2011/0210915 A1* | 9/2011 | Shotton | G06K 9/00369 345/157 |
| 2011/0248999 A1* | 10/2011 | Aoyagi | G06T 15/04 345/426 |
| 2011/0310121 A1* | 12/2011 | Baron | G09G 3/003 345/634 |
| 2012/0163723 A1* | 6/2012 | Balan | G06F 3/011 382/224 |
| 2012/0239174 A1* | 9/2012 | Shotton | G06K 9/00362 700/93 |
| 2013/0044912 A1* | 2/2013 | Kulkarni | G06K 9/00671 382/103 |
| 2013/0136358 A1* | 5/2013 | Dedhia | G06K 9/3241 382/173 |
| 2013/0230237 A1* | 9/2013 | Schlosser | G06T 7/10 382/164 |
| 2014/0049465 A1* | 2/2014 | Tremaine | G06F 3/017 345/156 |
| 2014/0072212 A1* | 3/2014 | Sorgi | G06T 7/11 382/164 |
| 2014/0204013 A1* | 7/2014 | O'Prey | G06F 3/017 345/156 |
| 2015/0309579 A1* | 10/2015 | Wang | G06F 3/017 345/156 |

* cited by examiner

USE OF 3D DEPTH MAP WITH LOW AND HIGH RESOLUTION 2D IMAGES FOR GESTURE RECOGNITION AND OBJECT TRACKING SYSTEMS

TECHNICAL FIELD

The embodiments disclosed herein relate to object tracking systems such as gesture recognition systems, and, in particular, to gesture recognition systems for controlling medical and other information systems.

INTRODUCTION

The following paragraphs are not an admission that anything discussed in them is prior art or part of the knowledge of persons skilled in the art.

U.S. Patent Publication No. US2014/0049465 (Tremaine et al.) discloses systems, methods and apparatuses for facilitating gesture-based control of an electronic device for displaying medical information. The gesture recognition apparatus includes a processor coupled to a camera, and an electronic device for displaying medical information. The processor receives image data and depth data from the camera, and extracts a gesture from the image data and the depth data. The processor generates a command that is compatible with the electronic device based on the extracted gesture, and provides the compatible command to the electronic device as an input command.

U.S. Pat. No. 8,134,637 (Rossbach et al.) discloses an imaging system that acquires z-depth and brightness data from first sensors, and acquires higher resolution RGB data from second sensors, and fuses data from the first and second sensors. According to Rossbach et al., the imaging system can model an RGBZ image whose resolution can be as high as resolution of the second sensors. Time correlation of captured data from first and second sensors is associated with captured image data. According to Rossbach et al., this permits arbitrary mapping between the two data sources, ranging from 1:many to many:1. Preferably pixels from each set of sensors that image the same target point are mapped. Many z-depth camera settings may be used to create a static environmental model. Non-correlative and correlative filtering is carried out, and up-sampling to increase resolution occurs, from which a three-dimensional model is constructed using registration and calibration data.

SUMMARY

According to some embodiments, there is a medical information system including a depth camera for generating a 3D depth map and a low-resolution 2D image, and an image camera for generating a high-resolution 2D image. A processor is in communication with the depth camera and the image camera. The processor is configured to: identify a human body part within the 3D depth map; identify an approximate object silhouette of the human body part within the low-resolution 2D image using information about the human body part from the 3D depth map; identify the approximate object silhouette in the high-resolution 2D image using information about the approximate object silhouette from the low-resolution 2D image; generate a refined object silhouette within the high-resolution 2D image using a region segmentation process; track the human body part using the refined object silhouette; extract a gesture based on tracking the human body part; and generate an input command based on the extracted gesture. The medical information system also includes an electronic device configured to receive the input command and display medical information based upon the input command.

The processor may be further configured to calculate an object centroid based on pixels located within the refined object silhouette. The processor may use the object centroid to track the human body part.

The region segmentation process may include: selecting a border region that partially overlaps the approximate object silhouette and extends partially outward from the object silhouette; selecting object seed pixels inside the border region and background seed pixels outside the border region; and determining whether a pixel within the border region is an object pixel or a background pixel based on probability in relation to the object seed pixels and the background seed pixels.

The region segmentation process may include a graph-based region segmentation algorithm. For example, the graph-based region segmentation algorithm may include one or more of: a random walker algorithm; a N-cuts algorithm; a normalized cuts algorithm; and a graph-cuts image segmentation algorithm.

The processor may be configured to: identify the approximate object silhouette within the low-resolution 2D image using a first mapping correlation between the 3D depth map and the low-resolution 2D image; and identify the approximate object silhouette in the high-resolution 2D image using a second mapping correlation between the low-resolution 2D image and the high-resolution 2D image.

The medical information system may also include a support frame. The depth camera and the image camera may be rigidly mounted to the support frame.

The processor may be configured to emulate a class compliant device as the input command.

The gesture extracted by the processor may include a first gesture corresponding to lateral movement of a hand to generate a mouse tracking command.

The gesture extracted by the processor may include a second gesture corresponding to a depth-wise movement of a hand to generate a mouse click command.

The medical information system may also include a feedback display connected to the processor. The processor may be configured to provide feedback indicative of the gesture that is being recognized via the feedback display.

According to some embodiments, there is a gesture recognition system including a depth camera for generating a 3D depth map and a low-resolution 2D image, and an image camera for generating a high-resolution 2D image. A processor is in communication with the depth camera and the image camera, the processor being configured to: identify a human body part within the 3D depth map; identify an approximate object silhouette of the human body part within the low-resolution 2D image using information about the human body part from the 3D depth map; identify the approximate object silhouette in the high-resolution 2D image using information about the approximate object silhouette from the low-resolution 2D image; generate a refined object silhouette within the high-resolution 2D image using a region segmentation process; track the human body part using the refined object silhouette; extract a gesture based on tracking the human body part; and generate an input command based on the extracted gesture.

According to some embodiments, there is an object tracker for tracking an object. The object tracker includes a depth camera for acquiring a 3D depth map and a low-resolution 2D image of the object, and an image camera for acquiring a high-resolution 2D image of the object. A processor is in communication with the depth camera and the image camera. The processor is configured to: identify a region of interest within the 3D depth map; identify an approximate object silhouette within the low-resolution 2D image using information about the region of interest from the 3D depth map; identify the approximate object silhouette in the high-resolution 2D image using information about the approximate object silhouette from the low-resolution 2D image; generate a refined object silhouette within the high-resolution 2D image using a region segmentation process; and track the object using the refined object silhouette.

The processor may be configured to: identify a human body part as the region of interest; extract a gesture based on tracking the human body part; and generate an input command based on the extracted gesture.

According to some embodiments, there is an object tracking method. The object tracking method includes the steps of: receiving a 3D depth map and a low-resolution 2D image of an object from a depth camera; receiving high-resolution 2D image of the object from an image camera; identifying a region of interest within the 3D depth map; identifying an approximate object silhouette within the low-resolution 2D image using information about the region of interest from the 3D depth map; identifying the approximate object silhouette in the high-resolution 2D image using information about the approximate object silhouette from the low-resolution 2D image; generating a refined object silhouette within the high-resolution 2D image using a region segmentation process; and tracking the object using the refined object silhouette.

The object tracking method may also include: identifying a human body part as the region of interest; extracting a gesture based on tracking the human body part; and generating an input command based on the extracted gesture.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. It is possible that an apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

Figure 1:
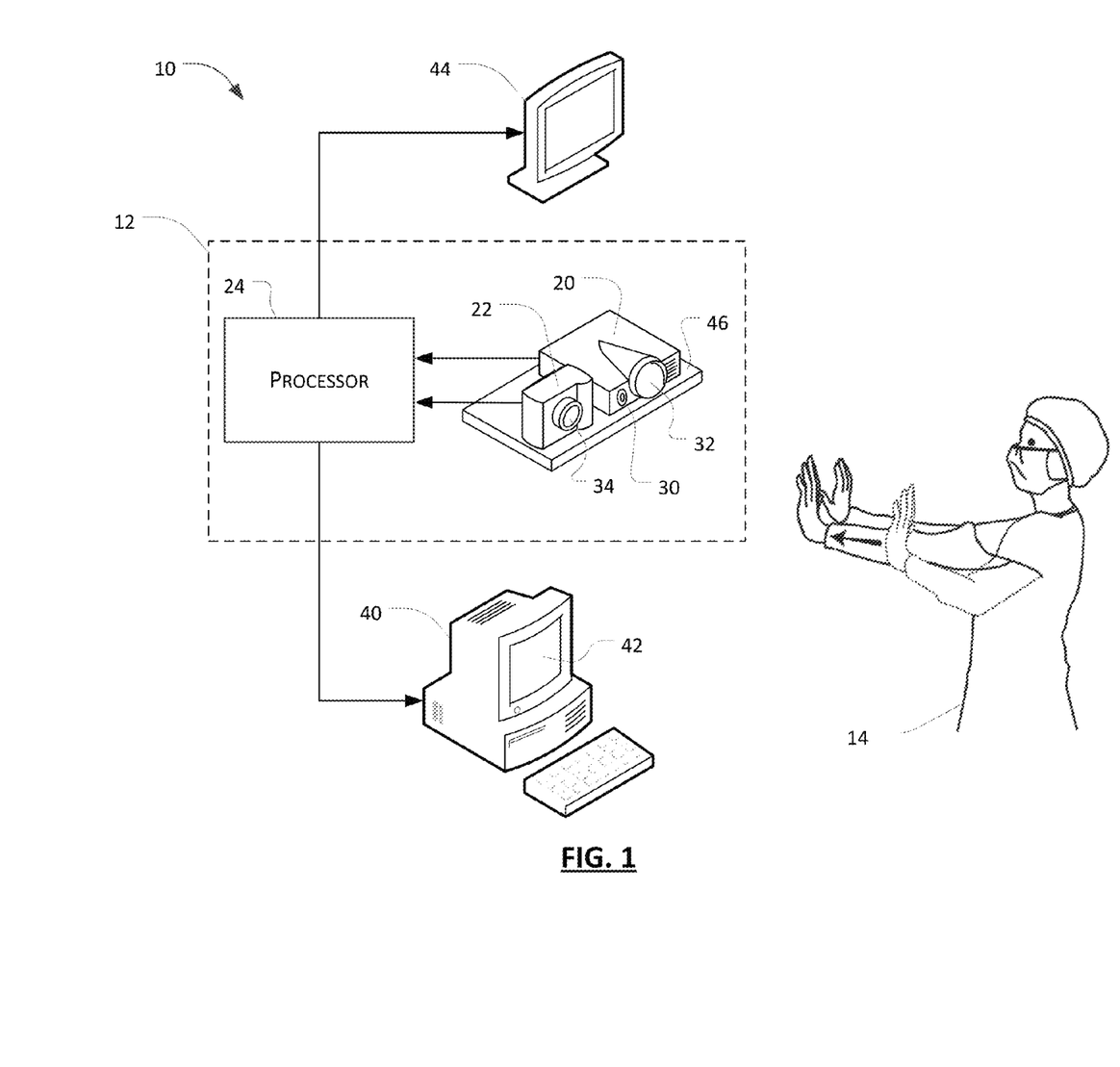
FIG. 1 is a schematic illustration of a gesture recognition system according to one embodiment.

Referring now to FIG. 1, illustrated therein is a gesture recognition system 10 that includes an object tracker 12 for tracking an object such as a user 14. In some embodiments, the gesture recognition system 10 may be used with a medical information system for displaying or manipulating medical images based on gestures performed by the user 14. In some embodiments, the object tracker 12 may be used on its own or with a system other than the gesture recognition system 10. For example, the object tracker 12 may be part of a machine vision system (e.g. for robotic part tracking).

The object tracker 12 includes a depth camera 20, an image camera 22, and a processor 24. The processor 24 is in communication with the depth camera 20 and the image camera 22 (e.g. via a wired or wireless connection). In general, the processor 24 uses low-resolution information from the depth camera 20 to generate an approximate object silhouette of an object such as the user 14, and then uses high-resolution information from the image camera 22 to generate a refined object silhouette based on the approximate object silhouette. This may be referred to as "upsampling" the object silhouette. The processor 24 uses the refined object silhouette to track the object. Use of the refined object silhouette can improve tracking accuracy compared to use of the approximate object silhouette. Further details about components of the object tracker 12 are described below.

The depth camera 20 captures or acquires a 3D depth map and a low-resolution 2D image within the field-of-view of the depth camera 20. For example, the depth camera 20 may include a depth sensor 30 for generating a 3D depth map, and a first optical sensor 32 for generating the low-resolution 2D image (e.g. using a Bayer filter array). In some embodiments, the depth camera 20 may be a Kinect™ depth camera marketed by Microsoft Inc or the Wavi™ Xtion™ depth camera marketed by ASUSTek Computer Inc. Other depth cameras could also be used.

In some embodiments, the depth camera 20 may include an infrared laser projector and a monochrome CMOS sensor, which may capture video data in three-dimensions under ambient light conditions. In some embodiments, the depth camera 20 may include a LIDAR, time of flight, binocular vision or stereo vision system. In stereo or binocular vision, the 3D depth map may be calculated from captured image data.

The image camera 22 captures or acquires a high-resolution 2D image within the field-of-view of the image camera 22. For example, the image camera 22 may include a second optical sensor 34 for generating the high-resolution 2D image or other data that is captured within the field-of-view of the image camera 22. The image camera 22 may be an industrial machine vision camera such as a high-resolution CMOS or CCD camera.

The image camera 22 provides a higher resolution than the low-resolution 2D image from the depth camera 20. For example, the low-resolution 2D image may be a 640×480 RGB image, and the high-resolution 2D image may be a 4096×2160 RGB image. In other embodiments, there could be other resolutions. For example, the low-resolution 2D image could be a 1280×720 RGB image, and the high-resolution 2D image could be a 1920×1080 RGB image. Higher or lower resolutions could also be used.

While the embodiments described herein are directed at 2D images including RGB image data, in some embodiments, the 2D images generated by the cameras 20, 22 could include other data, such as brightness data indicative of an amount of light captured at each pixel of the cameras 20, 22, or light field data indicative of the direction of the incident light capture at each pixel of the cameras 20, 22.

The processor 24 receives the 3D depth map, the low-resolution 2D image, and the high-resolution 2D image from the cameras 20, 22, and uses this information to track objects. For example, if a user 14 is within the field-of-view of the cameras 20, 22, the processor 24 may track the user 14, or movement of certain body parts of the user 14. The processor 24 may then extract gestures based on this tracking information and generate one or more input commands for operating one or more devices such as a computer 40. An exemplary embodiment of this process will be described below.

Figure 2:
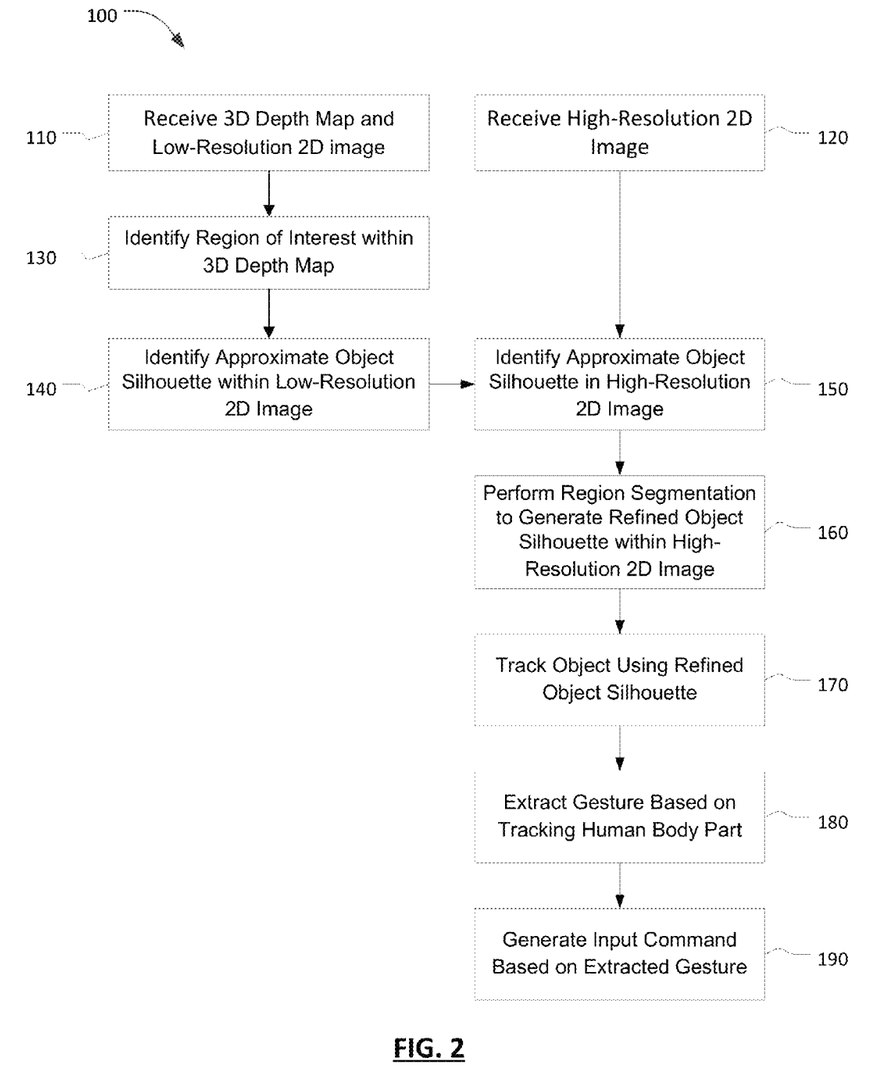
FIG. 2 is a flow chart depicting an object tracking method that may be performed by the gesture recognition system of FIG. 1.

Referring now to FIG. 2, an object tracking method 100 will now be described. The method 100 includes steps 110-170. In some embodiments, the method 100 may be performed by the processor 24.

Step 110 includes receiving a 3D depth map and a low-resolution 2D image. For example, the processor 24 may receive the 3D depth map and the low-resolution 2D image from the depth camera 20.

Step 120 includes receiving a high-resolution 2D image (e.g. from the image camera 22). For example, the processor 24 may receive the high-resolution 2D image from the image camera 22.

Steps 110 and 120 may occur at the same time or nearly the same time (e.g. contemporaneously with each other). In some embodiments, the processor 24 may time-stamp data received by the cameras 20, 22. This may allow the processor 24 to process the data even if data from the cameras 20, 22 is collected at different times, which may be useful when the processor 24 captures data from the cameras 202, 22 in a Continuous Polling Mode. In this case, data from the cameras 20, 22 may be refreshed periodically (e.g. every 3-5 milliseconds) so that the processor 24 processes the data a short time after occurrence of an activity (e.g. real-time or almost real-time).

In another embodiment, the processor 24 may be configured to operate the camera in an On-Demand Trigger Mode. In this case, the processor 24 may send the cameras 20, 22 a request for data, and the cameras 20, 22 may respond by sending data. In this case, the processor 24 may be configured with one or more time delays to allow each sensor to collect sufficient information in order to generate an image (e.g. collecting photons for an RGB image). As an example, the depth camera 30 may collect information faster than the image camera 32 and a time delay may account for this speed difference.

Step 130 includes identifying a region of interest within the 3D depth map. For example, when the object tracker 12 is used in the gesture recognition system 10, the processor 24 may identify a hand or another human body part of the user 14 as the region of interest.

In some embodiments, step 130 may include processing the 3D depth map (e.g. over time) to determine whether there are one or more users 14 or objects are in the field-of-view. For example, step 130 may include Foreground Segmentation to distinguish one or more foreground objects from background areas (e.g. to identify the user 14). More particularly, the processor 24 may use the 3D depth map to record the furthest non-transient distance for each point of the image for all frames. It should be understood that the "objects" above could include any features in the field-of-view of the camera that are not in the background, including, the user 14. In order to allow for camera movement, the furthest non-transient distance for each point of the image can be evaluated over a subset of the most recent frames. In this context, a moving object will appear as a foreground object that is separate from the background.

There may be various issues that may inhibit the ability to extract the foreground object from the background features. For example, the depth camera 20 may experience blind spots, shadows, and/or an infinite depth of field (e.g. the camera 20 may be pointed at glass or at an object beyond the range of infrared sensor). Furthermore, there could be reflective surfaces (e.g. mirrors) that could cause reflections. In some cases the depth camera 20 could be moving.

These challenges may be addressed by using a variety of techniques. For example, an algorithm may be used to track the furthest depth "Z" value at each point. This may enhance robustness of the Foreground Segmentation. In some embodiments, the algorithm may utilize histograms or other various average last distance measurements including mode and averaging over a window, and using buckets to measure statistical distribution.

In some embodiments, the processor 24 may also be configured to perform a Foreground Object Differentiation process to differentiate objects from each other within the foreground. In some cases, the foreground objects may be segmented (e.g. differentiated) from one another through Depth Segmentation. Generally, the Depth Segmentation process may be used in a situation where foreground objects that have borders that are depth-discontinuous and are segmented from one another.

In some embodiments, the processor 24 may be configured to extract a skeletal model of the user 14 from the image data and the depth data via a Skeletal Extraction process.

This Skeleton Extraction process may assist in identifying a region of interest within the 3D depth map (e.g. identifying the user 14). In some embodiments, the process to extract the skeletal model may be performed after one or more of the above-noted processes (e.g. after Foreground Segmentation, Foreground Object Differentiation, or Depth Segmentation).

To extract a skeletal model from a foreground object, the processor 24 may be configured to process the 3D depth map of that object to search for a calibration pose. The calibration pose, for example, could be a calibration gesture where the user 14 raises their hands above their head with elbows bent (e.g. as described in US2014/0049465). Once the calibration pose is detected, a heuristic skeletal model may be applied to the 3D depth map, and a recursive estimation of limb positions may occur. This recursive method may include one or more of the following steps:

1. An initial estimate of each joint position within the skeletal model may be generated (e.g. a heuristic estimate based on the calibration pose); and
2. The calibration pose may be fitted to the skeletal model.

Furthermore, the position of each joint within the skeletal model may be corrected based on a static analysis of the 3D depth map corresponding to the calibration pose. This correction may be performed using appearance-based methods such as: thinning algorithms and/or optical flow sub-clustering processes, or using model-based methods.

In some embodiments, the 3D depth map may be further processed to identify particular human body parts such as a user's hand. For example, the hand may be identified by all depth pixels within the skeletal model that extend beyond the midpoint between the elbow joint and the end of that arm.

Figure 3A:
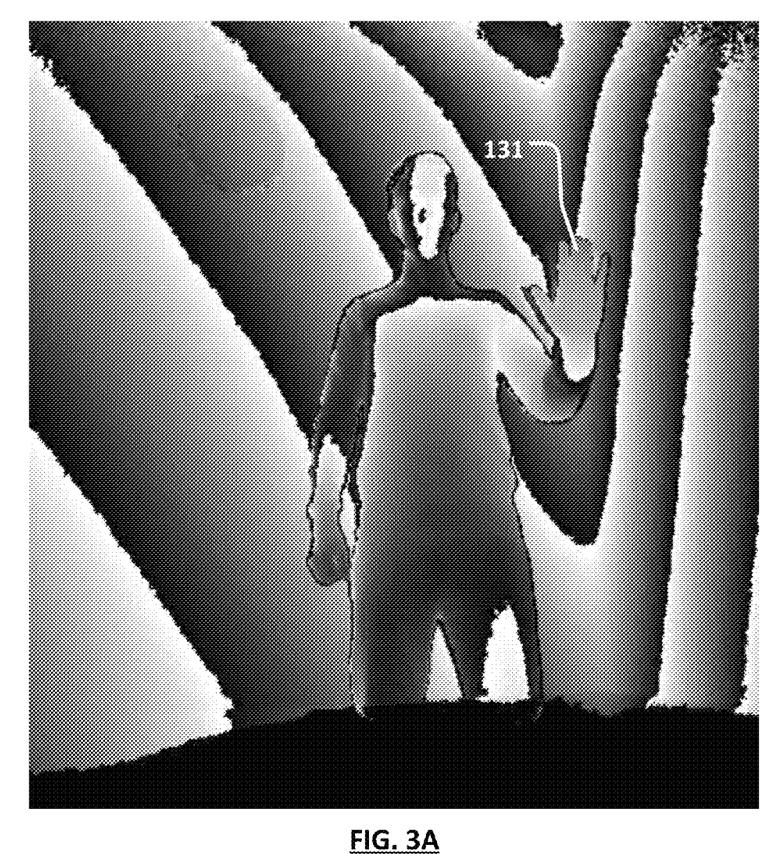
FIGS. 3A-3E exemplary images illustrating various steps of the method of FIG. 2.

FIG. 3A is an exemplary 3D depth map showing the user's hand as a region of interest 131 identified as a result of step 130.

Figure 3B:
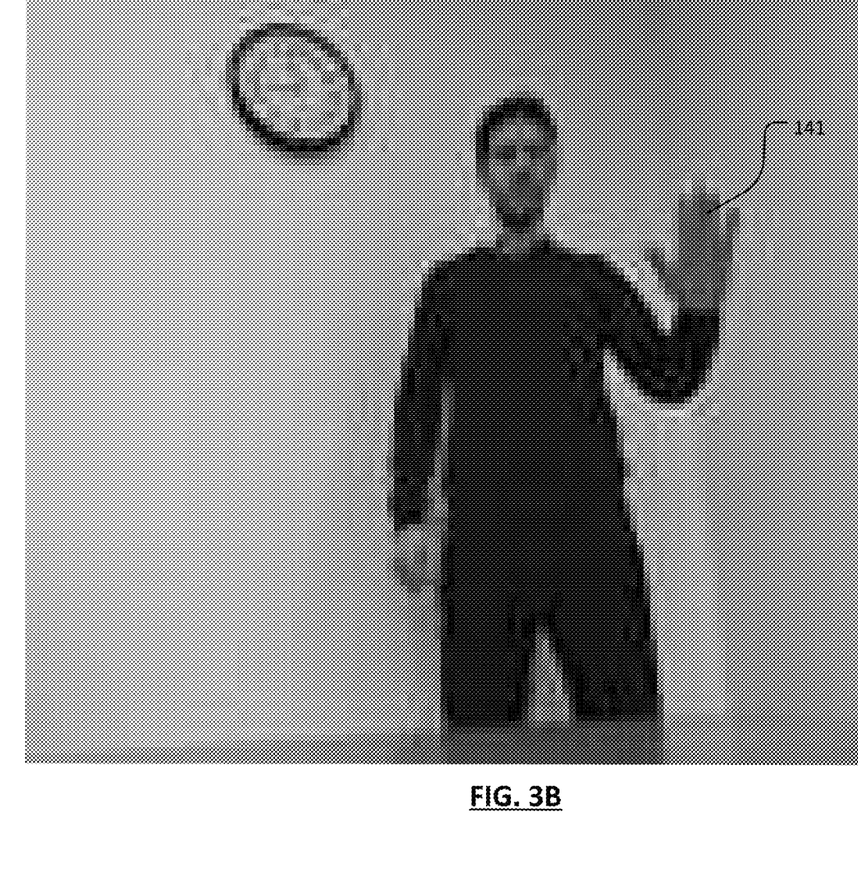

Step 140 includes identifying an approximate object silhouette within the low-resolution 2D image using information about the region of interest from the 3D depth map. For example, FIG. 3B shows an exemplary low-resolution 2D image with a hand silhouette identified as an approximate object silhouette 141 as a result of step 140. The hand silhouette (i.e. the approximate object silhouette 141) is identified based on identification of the user's hand from the 3D depth map at step 130.

As an example of step 140, the processor 24 may perform image mapping between the 3D depth map and the low-resolution 2D image. More particularly, a first mapping correlation may provide mapping information between a specific pixel in the 3D depth map and a corresponding pixel in the low-resolution 2D image. Thus, the pixels identified as the user's hand in the 3D depth map would correspond to the hand silhouette in the low-resolution 2D image (i.e. the approximate object silhouette 141). In some embodiments, the depth camera 20 may include internal hardware or software components (e.g. processor and/or circuit logic) that correlate the 3D depth map and the low-resolution 2D image.

Step 150 includes identifying the approximate object silhouette 141 in the high-resolution 2D image using information about the approximate object silhouette 141 from the low-resolution 2D image. For example, the processor 24 may perform image mapping between the low-resolution 2D image and the high-resolution 2D image. More particularly, a second mapping correlation may provide mapping information between a specific pixel in the low-resolution 2D image and a corresponding pixel in the high-resolution 2D image. The second mapping correlation may be built into hardware or software, and in some cases, may be calculated as a result of a calibration process which will be described later below with reference to FIG. 7.

Since the high-resolution 2D image has more pixels than the low-resolution 2D image, there may be a block of pixels identified as the hand silhouette in the high-resolution 2D image for each pixel in the low-resolution 2D image. Furthermore, each block of pixels in the high-resolution 2D image may be based on a fractional number of pixels that corresponds to one pixel in the low-resolution 2D image. For example, if the low-resolution 2D image is a 640×480 RGB image, and the high-resolution 2D image is a 4096×2160 RGB image, each block of pixels in the high-resolution 2D image may be 6.4 pixels wide and 4.5 pixels high. The second mapping correlation may account for the fractional number of pixels within each block.

Figure 3C:
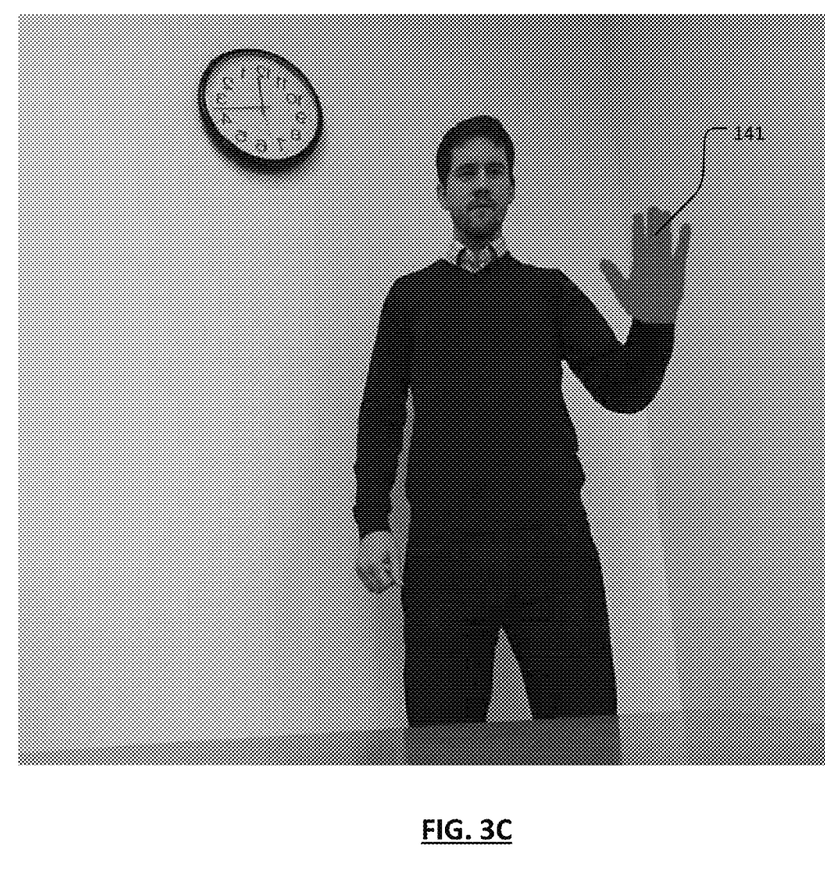

FIG. 3C is an exemplary high-resolution 2D image showing the hand silhouette (i.e. the approximate object silhouette 141) identified as a result of step 150.

Step 160 includes generating a refined object silhouette 161 (shown in FIG. 3E) within the high-resolution 2D image using a Region Segmentation process. As an example of step 160, a number of boundary pixels surrounding the approximate object silhouette 141 in the high-resolution 2D image can be processed to determine probability of being an object pixel (e.g. a hand pixel) or a background pixel. For example, the Region Segmentation process may include selecting a border region 164 that partially overlaps the approximate object silhouette 141 and extends partially outward from the object silhouette 141 (e.g. representing a narrow band along the outline of the object silhouette 141).

Figure 3D:
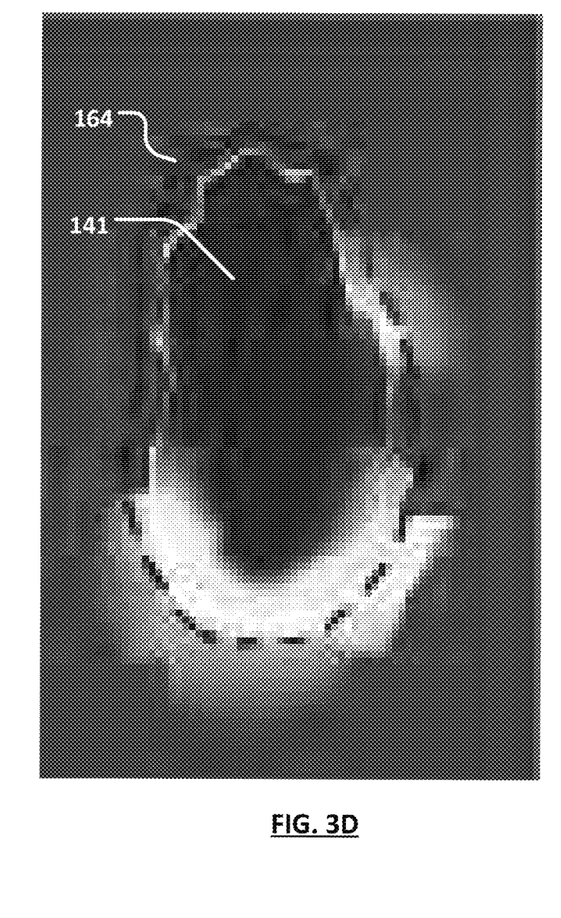

As indicated in FIG. 3D, the border region 164 may include pixels along the boundary between the hand and the background. The border region 164 may include a certain number of pixels offset inwardly towards the center of the hand (e.g. 10-pixels offset either vertically or horizontally (or both) towards the center of the hand), and a certain number of pixels offset outwardly from the hand (e.g. 10-pixels either vertically or horizontally (or both) offset outwardly from the hand).

The Region Segmentation process may also select object seed pixels inside the border region 164 and background seed pixels outside the border region 164. The Region Segmentation process then determines whether a pixel within the border region 164 is an object pixel or a background pixel based on probability in relation to the object seed pixels and the background seed pixels.

In some embodiments, the Region Segmentation process may be a graph-based region segmentation algorithm, such as a random walker algorithm, an N-cuts algorithm, a normalized cuts algorithm, a graph-cuts image segmentation algorithm, or another graph-based region segmentation process.

As an example, a random walker algorithm may receive: (1) a matrix of seed pixels and non-seed pixels; (2) a matrix of regional similarity between neighboring pixels, and (3) a pixel-pixel distance metric. The random walker algorithm may then output a relative probability that a random walker will get from a particular seed pixel to a non-seed pixel. This relative probability is then used to determine whether that particular non-seed pixel is an object pixel or a background pixel (e.g. part of the hand or not).

The pixel-pixel distance metric may be an $L^2$-norm (aka "Euclidean distance") of the RGB difference, which may be defined by the equation:

$$\text{Distance Metric} = \sqrt{(Ri-Rj)^2 + (Gi-Gj)^2 + (Bi-Bj)^2}$$

In other embodiments, the pixel-pixel distance metric could be other distance metrics such as $L^0$ norm (i.e. "vector maximum") or $L^1$ Norm (i.e. "manhattan distance"), or linear or nonlinear colour space transformations. Furthermore, other features could be incorporated into the distance metric, such as: local texture, multispectral information (e.g. IR from another camera or the same image camera), a bilinear interpolation of the depth image, frame-frame differences, edge presence (e.g. from an edge detector), or straight line presence (e.g. from a straight-line detector such as a Hough Transform).

In some embodiments, the Region Segmentation feature selection and weighting may be calibrated utilizing a set of representative ground truth samples, combined with optimization techniques, to determine the optimal colour space transformation, optimal features to incorporate, or optimal distance metrics. This process may help calibrate a nonlinear mix of inputs into the random walker algorithm.

Notably, Region Segmentation differs from mere boundary segmentation or edge detection. For example, Region Segmentation tends to look at more global information to make better inferences. Boundary segmentation and edge detection tend to use less information and have difficulties when seeds are on the wrong side of an edge.

Figure 3E:
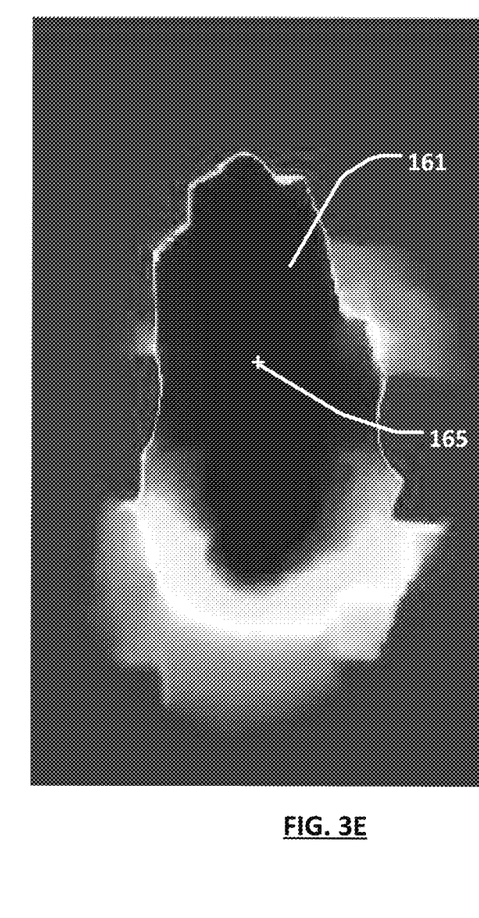

After completing the Region Segmentation process for all non-seed pixels within the border region, the object pixels are used to generate a refined object silhouette 161 within the high-resolution 2D image. FIG. 3E is an exemplary high-resolution 2D image showing the hand as a refined object silhouette 161 generated as a result of step 160.

Step 170 includes tracking the object using the refined object silhouette 161. For example, the processor 24 may calculate an object centroid 165 based on pixels located within the refined object silhouette 161 (e.g. a geometric center of the object). The processor 24 can then use the object centroid 165 to track the object between successive camera frames.

In some embodiments, the method 100 may include modifications or additional steps. For example, the method 100 may compare depth from frame-to-frame, and re-use information that has not changed between frames. In some embodiments, the method 100 may ignore regions with no space-time interest points (STIP).

In some embodiments, the method 100 may be optimized to re-compute information near edges and ignore other areas (e.g. only look at edges and interpolate or ignore swaths between them).

In some embodiments, the method 100 may use feature point track (i.e. SIFT or SURF) to infer the nature of optical flow.

In some embodiments, the method 100 may be used to interpolate or otherwise generate depth information for each pixel in the high-resolution 2D image. For example, this may be done by labelling each pixel from the low-resolution 2D image as a separate depth seed pixel. These depth seed pixels are then translated to the high-resolution 2D image (e.g. via the second mapping correlation). There may be one or more non-seed pixels surrounding the depth seed pixels in the high-resolution 2D image. An exemplary pixel map is shown in Table 1 below with numbered pixels corresponding to depth seed pixels, and the other pixels labelled with a dash (i.e. "-") corresponding to non-seed pixels.

TABLE 1

Exemplary Pixel Map of Depth Seed Pixels and
Non-Seed Pixels for Interpolating Depth

| 1 | — | — | 2 | — | — | 3 |
|---|---|---|---|---|---|---|
| 4 | — | — | 5 | — | — | 6 |
| 7 | — | — | 8 | — | — | 9 |

For each non-seed pixel, the method 100 may determine probably that the non-seed pixel is a member of every other depth seed pixel's group. For example, the method may generate a probability matrix, as shown in Table 2 below (e.g. for the non-seed pixel directly to the right of the depth seed-pixel labelled "1"):

TABLE 2

Probability Matrix for a Non-Seed
Pixel being a Member of a Particular
Numbered Seed Pixel Group

| 90% | 4% | 1% |
|---|---|---|
| 2% | 3% | 0% |
| 0% | 0% | 0% |

In this example, the non-seed pixel to the right of the seed-pixel labelled "1" may have a 90% probability of being part of the group for seed pixel "1", and a 4% probability of being part of the group for seed pixel "2".

The Probability matrix in Table 2 can be used to interpolate depth for each pixel in the high-resolution 2D image. For example, the depth of each pixel may be calculated by taking the dot-product of the probability matrix with the 3D depth map. As an example, a sample 3D depth map is shown below in Table 3:

TABLE 3

Sample 3D Depth Map

| 3 | 6 | 1 |
|---|---|---|
| 2 | 4 | 8 |
| 5 | 9 | 7 |

In this case, the depth of the non-seed pixel to the right of the seed-pixel labelled "1" could be calculated as: (0.90*3)+(0.04*6)+(0.01*1)+(0.02*2)+(0.03*4), which represents a depth value of 3.11.

In other embodiments, there may be other ways of calculating depth for each pixel in the high-resolution 2D image. In general, the calculation of depth for each pixel in the high-resolution 2D image can be used to help track objects in three dimensions.

As indicated above, the object tracker 12 may be used in a gesture recognition system 10 to recognize or extract gestures performed by the user 14 based on the object tracking. For example, the depth camera 20 and the image camera 22 may capture scenes including information indicative of activities of the user 14 such as movement of the user's hand or another body part.

When implemented in a gesture recognition system 10, the method 100 may include additional steps such as steps 180 and 190. Step 180 may include extracting a gesture based on tracking the human body part, and step 190 may include generating an input command based on the extracted gesture. As shown in FIG. 1, the input command could be used to control an electronic device such as a computer 40. For example, the processor 24 may be configured so that the input command generated emulates a USB-compliant mouse, or another class compliant device (e.g. a PS/2 mouse or USB keyboard). Some exemplary gestures and commands are described below.

Figure 4:
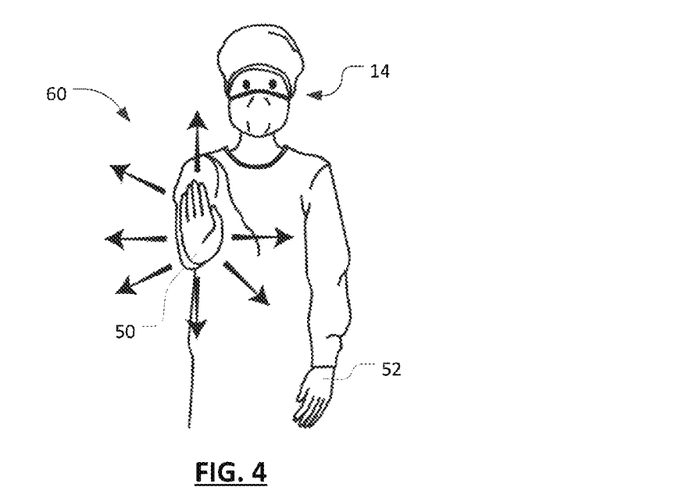
FIG. 4 is an exemplary gesture that may be extracted by the gesture recognition system of FIG. 1 in order to move a mouse pointer.

With reference to FIG. 4, the processor 24 may recognize whether the user's right hand 50 is moving laterally within the field of view of the cameras 20, 22 (e.g. movement up/down or sideways in a frontal plane generally perpendicular to the line of sight of the cameras 20, 22). This lateral movement may be tracked (e.g. using the object centroid 165) to extract a first gesture 60 in order to generate a command that moves a mouse pointer on a display 42 of the computer 40.

Figure 5:
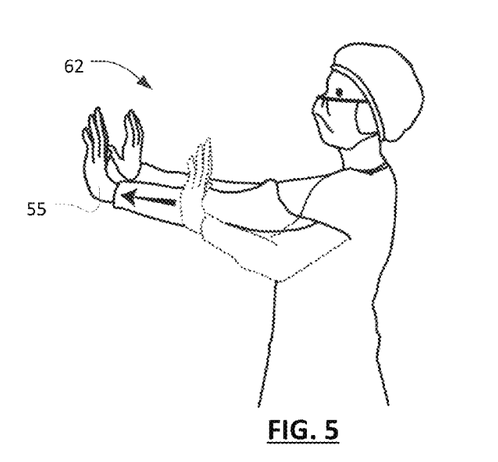
FIG. 5 is an exemplary gesture that may be extracted by the gesture recognition system of FIG. 1 in order to generate a left-mouse click command.
Figure 6:
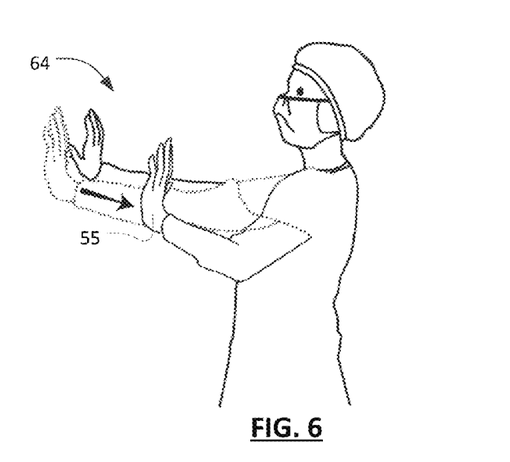
FIG. 6 is an exemplary gesture that may be extracted by the gesture recognition system of FIG. 1 in order to generate a right-mouse click command.

With reference to FIGS. 5 and 6, the processor 24 may recognize whether the user's left hand 52 is moving in a depth-wise direction (e.g. inward or outward relative to the cameras 20, 22). In this case, the object centroid 165 may also include a depth component based on data from the 3D depth map.

As shown in FIG. 5, a forward depth-wise movement may be tracked to extract a second gesture 62 in order to generate a command that corresponds to a left-mouse click command. As shown in FIG. 6, a backward depth-wise movement may be tracked to extract a third gesture 64 in order to generate a command that corresponds to a right-mouse click command. In some embodiments, the left-mouse click command may be generated based on the user 14 moving their hand straight forward, and the right-mouse click command may be generated based on the user 14 moving their hand forward and then right. In some embodiments, one hand may be used to generate the left-mouse click, and the other hand may be used to generate the right-mouse click command.

The processor 24 could also extract other gestures and generate other commands.

Referring again to FIG. 1, in some embodiments, the input commands from the processor 24 may be used to display or manipulate medical information. For example, the input commands may be used to zoom, scroll, or click through medical images on the display 42 of the computer 40.

The gesture recognition system 10 may also include a feedback display 44 connected to the processor 24. The processor 24 may be configured to provide video images or other feedback indicative of the gesture that is being recognized via the feedback display 44.

In some embodiments, the gesture recognition system 10 may include a support frame 46 such as a platform of a rolling cart. The depth camera 20 and the image camera 22 may be rigidly mounted to the support frame 46 (e.g. using screws, bolts, clips, adhesive or other fasteners). Rigidly mounting the cameras 20, 22 to the support frame 46 may help with calibrating the gesture recognition system 10 as will be described below.

Figure 7:
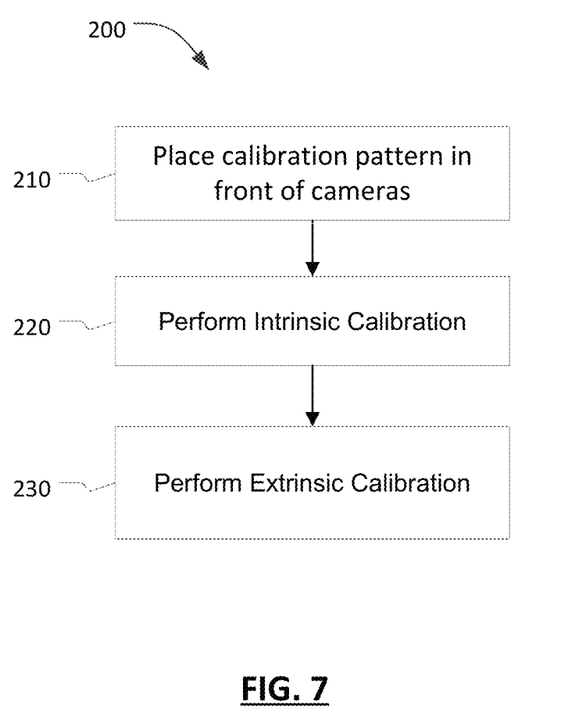
FIG. 7 is a flow chart depicting a calibration process that may be performed by the gesture recognition system of FIG. 1.

With reference to FIG. 7, a calibration process may be performed according to the method 200. The method includes steps 210, 220, and 230.

At step 210, a calibration pattern may be held in front of the depth camera 20 and image camera 22. The depth camera 20 captures a 3D depth map and a low-resolution 2D image of the calibration pattern. The image camera 22 captures a high-resolution 2D image of the calibration pattern.

At step 220, an intrinsic calibration is performed. This intrinsic calibration may compensate for imperfections and distortions in each camera 20, 22 (e.g. lens distortions). The intrinsic calibration may use a first algorithm to find the calibration pattern in each of the low-resolution 2D image and the high-resolution 2D image, and may use a second algorithm to find intrinsic camera calibrations for each of the low-resolution 2D image and the high-resolution 2D image (e.g. to correct for lens distortion and other distortions or image artifacts). The intrinsic calibrations may be performed independently for each camera 20, 20 without reference to the other camera.

At step 230, an extrinsic calibration is performed.

In some embodiments, there may be an extrinsic mapping correlation between the 3D depth map and the low-resolution 2D image. The extrinsic mapping correlation may accommodate spatial separation between the depth sensor 30 and the first optical sensor 32 (e.g. because the sensors 30, 32 are physically separated from each other and have different fields of views based on different points of reference). In some embodiments, the extrinsic mapping correlation may be built into hardware or software for the depth camera 20. The extrinsic mapping correlation may be used as the first mapping correlation described above in step 140. In some embodiments, there may not be an extrinsic mapping correlation between the 3D depth map and the low-resolution 2D image sensor (e.g. for some time-of-flight Sensors).

The extrinsic calibration may also compensate for spatial separation between the depth camera 20 and the image camera 22 (e.g. because the cameras 20, 22 are physically separated from each other and have different fields of views based on different points of reference). As an example, the extrinsic calibration may take calibration points in the low-resolution 2D image, and find their corresponding 3D positions from the 3D depth map using the first mapping correlation. At this point, 3D positions of the calibration points are known for the depth camera 20 (i.e. using the 3D depth map and low-resolution 2D image), and 2D positions of the calibration points are known for image camera 22 (i.e. using the high-resolution 2D image). The calibration process then uses this information to generate an extrinsic (spatial) mapping correlation between the high-resolution 2D image and the low-resolution 2D image and/or the 3D depth map. The extrinsic mapping correlation may be used as the second mapping correlation described above in step 150

Having the cameras rigidly mounted to the support frame 46 during and after the calibration process can help maintain calibration and may reduce or inhibit the possibility of incorrect image processing.

Figure 8:
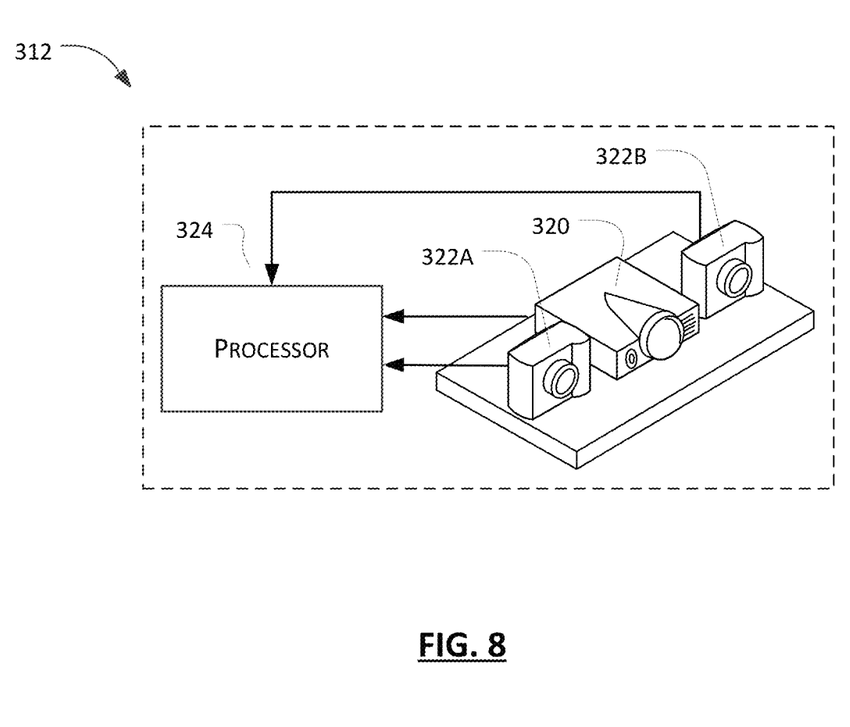
FIG. 8 is a schematic illustration of an object tracker according to another embodiment.

Referring now to FIG. 8, there is an object tracker 312 according to another embodiment. The object tracker 312 is similar in some respects to the object tracker 12 and similar features are given similar reference numerals incremented by three hundred. For example, the object tracker 312 includes a depth camera 320 and a processor 324. In this embodiment, the object tracker 312 includes two image cameras 322A, 322B.

The processor 324 may use the depth camera 320 to generate a refined object silhouette for each image camera 322A, 322B. These two refined object silhouettes can be combined to generate enhanced depth resolution compared to that of the 3D depth map of the depth camera 320. More particularly, the refined object silhouette in each high-resolution 2D image can be used to compute stereo disparity, and the processor 324 may then compute depth distances (e.g. using extrinsic calibrations). The extrinsic calibrations can be generated for each image camera 322A, 322B using one or more methods similar to the one described with reference to FIG. 7. As a result, the processor 324 may generate high-resolution 3D information (e.g. including both high-resolution 2D information and high-resolution depth information).

In some embodiments, the processor 324 may use an extrinsic calibration to help perform Region Segmentation. For example, the Region Segmentation may be completed for the first image camera 322A, and then object seed pixels and background seed pixels may be calculated for the second image camera 322B using an extrinsic calibration between the first image camera 322A and the second image camera 322B.

In some embodiments, the object tracker 312 may provide stereo vision, which can be used to perform high-resolution object tracking or object identification in three dimensions. The object tracker 312 may be used as part of a machine vision system for robotic part tracking, which may allow a robot to pick a particular object or part from a pile and then install or otherwise orient that part for further use.

In some cases, one or more of the embodiments as described herein may provide one or more benefits. For example, use of a 3D depth map in conjunction with low-resolution and high-resolution 2D images might improve accuracy of object tracking and gesture recognition. More particularly, tracking a refined object silhouette that is generated using a high-resolution 2D image in accordance with some embodiments herein might provide better tracking accuracy in comparison to use of a single low-resolution 2D image. This may be particularly beneficial when a user's hand or other body part is being used to control an input device on a computing device, such as mouse pointer of a computer. Some embodiments described herein might also be beneficial for robotic part tracking where identification of small part details are used for orientation and/or installation parts.

As another potential benefit, the identification of a region of interest might help improve processing performance. For example, previous methods such as the one taught in U.S. Pat. No. 8,134,637 tend to focus on upscaling or otherwise processing an entire image, which can be computationally intensive. It may be difficult or impractical to process an entire image in real-time using such techniques.

In contrast, the embodiments disclosed herein might be capable of upscaling or otherwise processing a portion of an image by initially identifying a region of interest from a 3D depth map (e.g. identification of a user's hand) and then processing a portion of an image near that region of interest. This may provide for significantly more efficient computational processing as compared to processing the entire image. Furthermore, such new techniques might enable processing of data in real-time or substantially real-time, which can be beneficial for gesture recognition or other forms of object tracking and which may not be practical or indeed even possible using other prior techniques.

While the above description provides examples of one or more apparatus, methods, or systems, it will be appreciated that other apparatus, methods, or systems may be within the scope of the claims as interpreted by one of skill in the art.

The invention claimed is:

1. A medical information system comprising:
    (a) a depth camera for generating a 3D depth map and a low-resolution 2D image;
    (b) an image camera for generating a high-resolution 2D image; and
    (c) a processor in communication with the depth camera and the image camera, the processor being configured to:
        (i) identify a human body part within the 3D depth map;
        (ii) identify an approximate object silhouette of the human body part within the low-resolution 2D image using information about the human body part from the 3D depth map;
        (iii) identify the approximate object silhouette in the high-resolution 2D image using information about the approximate object silhouette from the low-resolution 2D image;
        (iv) generate a refined object silhouette within the high-resolution 2D image using a region segmentation process;
        (v) track the human body part using the refined object silhouette;
        (vi) extract a gesture based on tracking the human body part; and
        (vii) generate an input command based on the extracted gesture; and
    (d) an electronic device configured to receive the input command and display medical information based upon the input command.

2. The medical information system of claim 1, wherein the processor is further configured to calculate an object centroid based on pixels located within the refined object silhouette, and wherein the processor uses the object centroid to track the human body part.

3. The medical information system of claim 1, wherein the region segmentation process includes:
    (a) selecting a border region that partially overlaps the approximate object silhouette and extends partially outward from the approximate object silhouette;
    (b) selecting object seed pixels inside the border region and background seed pixels outside the border region; and
    (c) determining whether a pixel within the border region is an object pixel or a background pixel based on probability in relation to the object seed pixels and the background seed pixels.

4. The medical information system of claim 1, wherein the region segmentation process includes a graph-based region segmentation algorithm.

5. The medical information system of claim 4, wherein the graph-based region segmentation algorithm includes at least one of:
    (a) a random walker algorithm;
    (b) a N-cuts algorithm;
    (c) a normalized cuts algorithm; and
    (d) a graph-cuts image segmentation algorithm.

6. The medical information system of claim 1, wherein the processor is configured to:
    (a) identify the approximate object silhouette within the low-resolution 2D image using a first mapping correlation between the 3D depth map and the low-resolution 2D image; and
    (b) identify the approximate object silhouette in the high-resolution 2D image using a second mapping correlation between the low-resolution 2D image and the high-resolution 2D image.

7. The medical information system of claim 1, further comprising a support frame, wherein the depth camera and the image camera are rigidly mounted to the support frame.

8. The medical information system of claim 1, wherein the processor is configured to emulate a class compliant device as the input command.

9. The medical information system of claim 1, wherein the gesture extracted by the processor includes a first gesture corresponding to lateral movement of a hand to generate a mouse tracking command.

10. The medical information system of claim 1, wherein the gesture extracted by the processor includes a second gesture corresponding to a depth-wise movement of a hand to generate a mouse click command.

11. The medical information system of claim 1, further comprising a feedback display connected to the processor, the processor configured to provide feedback indicative of the gesture that is being recognized via the feedback display.

12. A gesture recognition system comprising:
   (a) a depth camera for generating a 3D depth map and a low-resolution 2D image;
   (b) an image camera for generating a high-resolution 2D image; and
   (c) a processor in communication with the depth camera and the image camera, the processor being configured to:
      (i) identify a human body part within the 3D depth map;
      (ii) identify an approximate object silhouette of the human body part within the low-resolution 2D image using information about the human body part from the 3D depth map;
      (iii) identify the approximate object silhouette in the high-resolution 2D image using information about the approximate object silhouette from the low-resolution 2D image;
      (iv) generate a refined object silhouette within the high-resolution 2D image using a region segmentation process;
      (v) track the human body part using the refined object silhouette;
      (vi) extract a gesture based on tracking the human body part; and
      (vii) generate an input command based on the extracted gesture.

13. The gesture recognition system of claim 12, wherein the processor is further configured to calculate an object centroid based on pixels located within the refined object silhouette, and wherein the processor uses the object centroid to track the human body part.

14. The gesture recognition system of claim 12, wherein the region segmentation process includes:
   (a) selecting a border region that partially overlaps the approximate object silhouette and extends partially outward from the approximate object silhouette;
   (b) selecting object seed pixels inside the border region and background seed pixels outside the border region; and
   (c) determining whether a pixel within the border region is an object pixel or a background pixel based on probability in relation to the object seed pixels and the background seed pixels.

15. The gesture recognition system of claim 12, wherein the region segmentation process includes a graph-based region segmentation algorithm.

16. The gesture recognition system of claim 15, wherein the graph-based region segmentation algorithm includes at least one of:
   (a) a random walker algorithm;
   (b) a N-cuts algorithm;
   (c) a normalized cuts algorithm; and
   (d) a graph-cuts image segmentation algorithm.

17. An object tracker for tracking an object, the object tracker comprising:
   (a) a depth camera for acquiring a 3D depth map and a low-resolution 2D image of the object;
   (b) an image camera for acquiring a high-resolution 2D image of the object; and
   (c) a processor in communication with the depth camera and the image camera, the processor being configured to:
      (i) identify a region of interest within the 3D depth map;
      (ii) identify an approximate object silhouette within the low-resolution 2D image using information about the region of interest from the 3D depth map;
      (iii) identify the approximate object silhouette in the high-resolution 2D image using information about the approximate object silhouette from the low-resolution 2D image;
      (iv) generate a refined object silhouette within the high-resolution 2D image using a region segmentation process; and
      (v) track the object using the refined object silhouette.

18. The object tracker of claim 17, wherein the processor is further configured to calculate an object centroid based on pixels located within the refined object silhouette, and wherein the processor uses the object centroid to track the object between successive camera frames.

19. The object tracker of claim 17, wherein the region segmentation process includes:
   (a) selecting a border region that partially overlaps the approximate object silhouette and extends partially outward from the approximate object silhouette;
   (b) selecting object seed pixels inside the border region and background seed pixels outside the border region; and
   (c) determining whether a pixel within the border region is an object pixel or a background pixel based on probability in relation to the object seed pixels and the background seed pixels.

20. The object tracker of claim 17, wherein the region segmentation process includes a graph-based region segmentation algorithm.

* * * * *